E. F. MORSE.
Lawn Mower and Bearing.
No. 225,232. Patented Mar. 9, 1880.
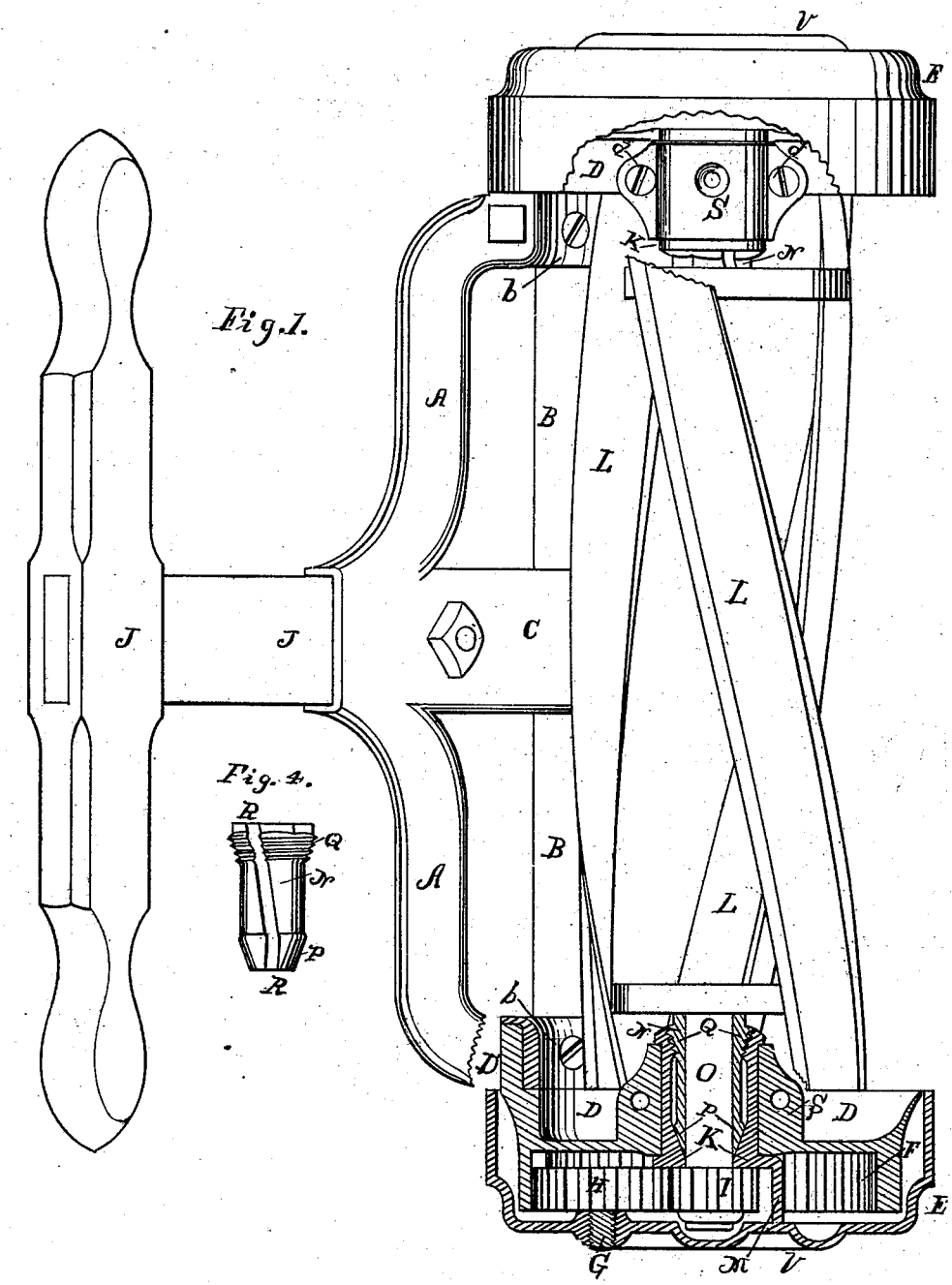
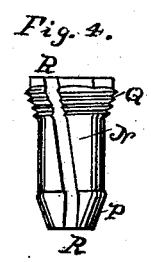
Witnesses:
James Norton
George Carpenter
Inventor:
E. Flint Morse 2 Sheets—Sheet 2.
E. F. MORSE.
Lawn Mower and Bearing.
No. 225,232. Patented Mar. 9, 1880.
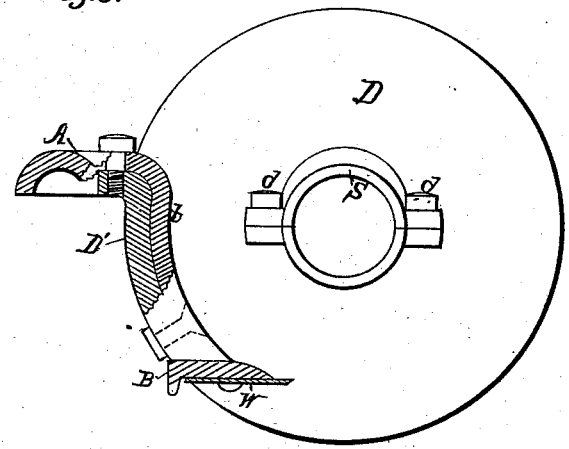
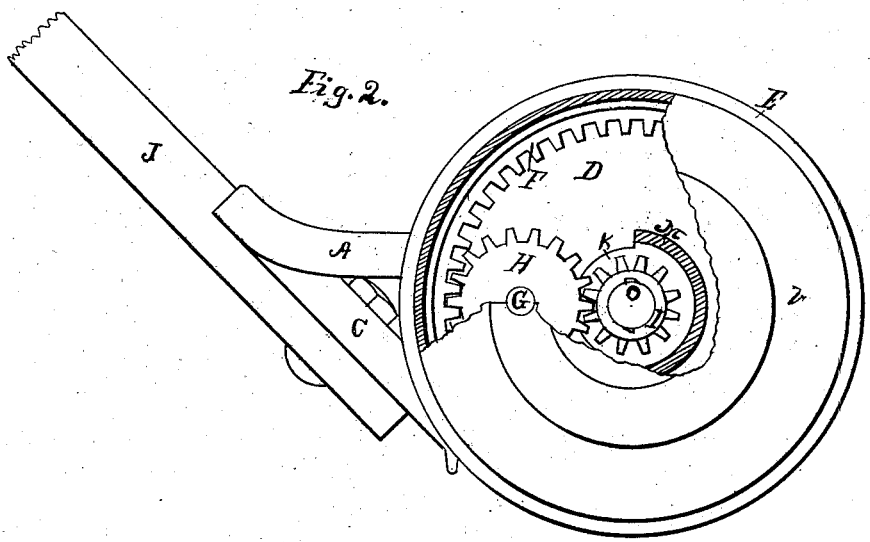
Witnesses:
James Norton
George Carpenter
Inventor:
E. Flush Morse drical bore of the same size as or a little larger than shaft O, and on its outer side it has two parallel conical surfaces, P and Q, one of which has a thread on it, the other being left plane. Between these conical surfaces it is of a cylindrical form, and from end to end of this bearing is a slit, R R, extending through to the bore, and enabling the bore to be made smaller by pressing the sides of this slit together. The outer end of this bearing is made to receive a wrench, with which it can be turned.

The hub K K has on its inner side two conical surfaces similar to the conical surfaces on the bearing N N, so as to receive N N, as shown in Fig. 1. As the bearing N N is screwed up it is forced longitudinally into the hub or case K K, and as the result of this movement the sides of the slit are pressed nearer together, and the bore, which comes in contact with and is a bearing for shaft O, is made smaller equally throughout its whole extent by the conical surfaces P and Q being in contact with the corresponding conical surfaces in case K K. This bearing may be forced longitudinally by threads on a cylindrical surface, or by a separate nut being screwed against it.

The cylindrical part between the conical surfaces is to lengthen the bearing, and when the bearing is short this part may be dispensed with, and the two conical surfaces may then form but one, and if the bearing is very long it may have three (or even more) conical surfaces on its outside. This improvement in the bearing is not only adapted to lawn-mowers, but also to friction-pulleys and to bearings generally.

In operation the operator seizes the handle and pushes the machine before him. The driving-wheels communicate their motion to the planetary gears, which communicate theirs, through the pinions and shaft, to the rotary cutter, and as this revolves by the stationary knife it shears off the grass.

What I claim as new, and desire to secure by Letters Patent, is—

1. The yoke A B C, consisting of an upper and lower part connected together at the ends by the parts b b, and at or near the middle by the handle-receiver C, which has flanges projecting from the edges of its lower side to receive and hold securely the handle J, substantially as set forth, in combination with and connected to the stationary ends of a lawn-mower.

2. The wheel E, having its hub K K set apart from the face of the wheel, so that the wheel or pinion I can be placed between them, said hub supporting the frame on its outside and the rotary cutter on its inside, and being connected to said face by one or more arms, M, substantially as set forth.

3. The bearing N N, with a slit extending from end to end, and having on its outside one or more conical surfaces, and within a bore, which comes in contact with and is a bearing for shaft O, in combination with a hub or case having similar conical surfaces on its inside, substantially as and for the purpose set forth.

4. The bearing N N, with a slit extending from end to end, and having on its outside two parallel conical surfaces placed, respectively, at or near each end, and one of which surfaces has a thread on it, in combination with a hub or case having on its inside similar conical surfaces, so as to receive bearing N N, substantially as and for the purpose set forth.

In testimony that I claim the above I have hereunto subscribed my name in the presence of two witnesses.

E. FLEET MORSE.

Witnesses:
BEN MORSE,
WM. J. TOTTEN.